(12) United States Patent
Yoon (10) Patent No.: US 11,846,339 B2
(45) Date of Patent: Dec. 19, 2023

(54) METHOD OF BALANCING ASSEMBLY OF WHEEL AND TIRE

(71) Applicants: Hyundai Motor Company, Seoul (KR); Kia Motors Corporation, Seoul (KR)

(72) Inventor: Young Sam Yoon, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 684 days.

(21) Appl. No.: 17/029,728

(22) Filed: Sep. 23, 2020

(65) Prior Publication Data

US 2021/0388883 A1 Dec. 16, 2021

(30) Foreign Application Priority Data

Jun. 12, 2020 (KR) .................. 10-2020-0071624

(51) Int. Cl.
*F16F 15/20* (2006.01)
*G01M 1/14* (2006.01)
*G01M 1/36* (2006.01)

(52) U.S. Cl.
CPC .............. *F16F 15/20* (2013.01); *G01M 1/14* (2013.01); *G01M 1/36* (2013.01); *B60B 2320/10* (2013.01);
(Continued)

(58) Field of Classification Search
CPC ............ F16F 15/20; G01M 1/14; G01M 1/36; G01M 1/16; G01M 1/326; G01M 1/225;
(Continued)

(56) References Cited

U.S. PATENT DOCUMENTS 4,404,848 A * 9/1983 Iwama ................ G01M 17/022
 73/146
9,785,610 B1 * 10/2017 Larson .................... G06F 17/00
(Continued)

FOREIGN PATENT DOCUMENTS

KR 10-2007-0039107 A 4/2007
KR 10-1283426 B1 7/2013
(Continued)

*Primary Examiner* — Mohammad K Islam
(74) *Attorney, Agent, or Firm* — MORGAN, LEWIS & BOCKIUS LLP (57) ABSTRACT

A method of balancing an assembly of a wheel and a tire, may include measuring a maximum-value position of RFV of a tire and marking the measured maximum-value position, as a tire reference position, measuring each of the internal runout and external runout of the wheel, extracting a primary component of a waveform of the measured internal runout and a primary component of a waveform of the measured external runout and setting the former and latter measured primary components to be internal and external runout waveforms, respectively, synthesizing the internal and external runout waveforms and marking a minimum-value position on a synthesis waveform resulting from the synthesizing, as a wheel reference position, and aligning the tire reference position on the tire and the wheel reference position on the wheel to have the same phase and assembling the wheel and the tire.

9 Claims, 9 Drawing Sheets

(52) U.S. Cl.
CPC ..... *B60B 2320/30* (2013.01); *B60B 2900/131* (2013.01); *B60B 2900/50* (2013.01)

(58) Field of Classification Search
CPC ............. G01M 17/022; B60B 2320/10; B60B 2320/30; B60B 2900/131; B60B 2900/50; G01B 21/26; B60C 25/0548; B60C 19/003; B60C 25/002; B60Y 2304/09
See application file for complete search history.

(56) References Cited

U.S. PATENT DOCUMENTS

| | | | |
|---|---|---|---|
| 2002/0100321 A1 | 8/2002 | Douglas et al. | |
| 2002/0163245 A1* | 11/2002 | Watanabe | B60B 1/08 301/5.21 |
| 2003/0005757 A1* | 1/2003 | Koeune | B60C 19/003 73/146 |
| 2008/0282799 A1* | 11/2008 | Douglas | G01M 1/16 73/460 |
| 2011/0221086 A1* | 9/2011 | Hair | G01M 17/024 425/28.1 |
| 2014/0303908 A1* | 10/2014 | Sotgiu | G01M 17/02 702/41 |
| 2018/0313723 A1* | 11/2018 | Oblizajek | G01M 17/027 |

FOREIGN PATENT DOCUMENTS

| | | |
|---|---|---|
| KR | 10-2016-0060806 A | 5/2016 |
| KR | 10-1637737 B1 | 7/2016 |

* cited by examiner

| | | SAMPLE 1 | SAMPLE 2 | SAMPLE 3 | SAMPLE 4 |
|---|---|---|---|---|---|
| LOGIC 2 | INNER RUNOUT | LESS THAN 0.05 | 0.15~0.3 | 0.15~0.3 | 0.15~0.3 |
| | OUTER RUNOUT | 0.15~0.3 | LESS THAN 0.05 | 0.15~0.3 | 0.15~0.3 |
| | PHASE | | | SAME PHASE | REVERSE PHASE |
| | (WI, WO diagrams with MINIMUM POINT OF INNER RUNOUT) | WI / WO | WI / WO | WI / WO | WI / WO |
| BEST SOLUTION (PRESENT INVENTION) | | WT | WT | WT | WT |
| EVALUATION OF LOGIC 2 | | MINIMUM-VALUE POSITION IS NOT LOCATED | POINT CLOSE TO MINIMUM-VALUE POSITION IS LOCATED | MINIMUM-VALUE POSITION IS LOCATED | MINIMUM-VALUE POSITION IS NOT LOCATED |

FIG. 6

| | | SAMPLE 1 | SAMPLE 2 | SAMPLE 3 | SAMPLE 4 |
|---|---|---|---|---|---|
| LOGIC 3 | INNER RUNOUT | LESS THAN 0.05 | 0.15~0.3 | 0.15~0.3 | 0.15~0.3 |
| | OUTER RUNOUT | 0.15~0.3 | LESS THAN 0.05 | 0.15~0.3 | 0.15~0.3 |
| | PHASE | | | SAME PHASE | REVERSE PHASE |
| | (diagram: WI + WO = WA) | WI + WO = WA | WI + WO = WA | WI + WO = WA | WI + WO = WA |
| | WT | WT | WT | WT | WT |
| | AVERAGE MINIMUM POINT OF INNER RUNOUT | | | | |
| BEST SOLUTION (PRESENT INVENTION) EVALUATION OF LOGIC 3 | | POINT CLOSE TO MINIMUM-VALUE POSITION IS LOCATED | POINT CLOSE TO MINIMUM-VALUE POSITION IS LOCATED | MINIMUM-VALUE POSITION IS LOCATED | MINIMUM-VALUE POSITION IS NOT LOCATED |

FIG. 7

| | | SAMPLE 1 | SAMPLE 2 | SAMPLE 3 | SAMPLE 4 |
|---|---|---|---|---|---|
| | INNER RUNOUT | LESS THAN 0.05 | 0.15~0.3 | 0.15~0.3 | 0.15~0.3 |
| | OUTER RUNOUT | 0.15~0.3 | LESS THAN 0.05 | 0.15~0.3 | 0.15~0.3 |
| | PHASE | | | SAME PHASE | REVERSE PHASE |
| PRESENT INVENTION | MINIMUM POINT ON SYNTHESIS WAVEFORM RESULTING FROM SYNTHESIZING INNER AND OUTER RUNOUT WAVEFORMS | WI + WO ⇒ WT | WI + WO ⇒ WT | WI + WO ⇒ WT | WI + WO ⇒ WT |
| | EVALUATION OF PRESENT INVENTION | MINIMUM-VALUE POSITION IS LOCATED | MINIMUM-VALUE POSITION IS LOCATED | MINIMUM-VALUE POSITION IS LOCATED | MINIMUM-VALUE POSITION IS LOCATED |

METHOD OF BALANCING ASSEMBLY OF WHEEL AND TIRE

CROSS REFERENCE TO RELATED APPLICATION

The present application claims priority to Korean Patent Application No. 10-2020-0071624, filed Jun. 12, 2020, the entire contents of which is incorporated herein for all purposes by this reference.

BACKGROUND OF THE INVENTION

Field of the Invention

The present invention relates to technology for balancing an assembly of a wheel and a tire.

Description of Related Art

Wheels on each of which a tire is mounted are rotatably coupled to a vehicle, and thus rotate while the vehicle travels. Balancing of an assembly of the wheel has a critical effect on whether or not the vehicle travels smoothly and quietly.

Ideally, tires and wheels may be manufactured to have the feature of being uniform in precision along a circumferential direction thereof, but in practice, they are manufactured with the extent of slight tire and wheel imbalance.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method of balancing an assembly of a wheel and a tire, which is configured for providing a more appropriate balance between a tire and a wheel and thus reducing vibration of a vehicle body, slight shaking of a steering wheel, or the like while a vehicle travels. The method provides the advantage that vehicle-riding comfort may be improved.

According to various aspects of the present invention, there is provided a method of balancing an assembly of a wheel and a tire, the method including: measuring a maximum-value position of RFV of a tire and marking the measured maximum-value position, as a tire reference position, on the tire; measuring each of an internal runout and an external runout of the wheel; extracting a primary component of a waveform of the measured internal runout and a primary component of a waveform of the measured external runout and setting the former and latter measured primary components to be an internal runout waveform and an external runout waveform, respectively; synthesizing the internal runout waveform and the external runout waveform and marking a minimum-value position on a synthesis waveform resulting from the synthesizing, as a wheel reference position, on the wheel; and aligning the tire reference position on the tire and the wheel reference position on the wheel to have the same phase and assembling the wheel and the tire.

In the method, the maximum-value position of the RFV of the tire may be set as a maximum-value position of a primary component of the RFV.

In the method, in synthesizing the internal runout waveform and the external runout waveform of the wheel, the internal runout waveform and the external runout waveform may be caused to overlap, and only profile portions each of which has a relatively higher value or the same value may be connected, forming the synthesis waveform.

In the method, in causing the internal runout waveform and the external runout waveform to overlap, a one-period portion of the internal runout waveform and a one-period portion of the external runout waveform, which have a same phase, may be caused to overlap in a state where both ends of the one-period portion of the internal runout wave are set to be the same as both ends, respectively, of the one-period portion of the external runout wave.

According to various aspects of the present invention, there is provided a method of balancing an assembly of a wheel and a tire, the method including: measuring each of an internal runout and an external runout of the wheel; extracting an internal runout waveform, expressed as a continuous function, from data resulting from measuring the internal runout of the wheel; extracting an external runout waveform, expressed as a continuous function, from data resulting from measuring the external runout of the wheel; synthesizing the internal runout waveform and the external runout waveform and thus generating a synthesis waveform; marking a minimum-value position on the synthesis waveform, as a wheel reference position, on the wheel; measuring RFV of a tire; extracting a waveform of the tire, plotted as a continuous function, from data resulting from measuring the RFV of the tire; marking a maximum-value position on the waveform of the tire, as a tire reference position, on the tire; and assembling the wheel and the tire in a state where the wheel reference position on the wheel and the tire reference position on the tire are aligned to have a same phase.

In the method, in the extracting of the internal runout waveform from the data resulting from measuring the internal runout of the wheel, Fourier transform may be performed on the data resulting from measuring the internal runout of the wheel, a primary component of the Fourier-transformed data may be extracted, and the extracted primary component may be set to be the internal runout wave.

In the method, in the extracting of the external runout waveform from the data resulting from measuring the external runout of the wheel, Fourier transform may be performed on the data resulting from measuring the external runout of the wheel, a primary component of the Fourier-transformed data may be extracted, and the extracted primary component may be set to be the external runout wave.

In the method, in the synthesizing of the internal runout waveform and the external runout waveform and thus in the generating of the synthesis waveform, in a state where a one-period portion of the internal outrun waveform and a one-period portion of the external outrun waveform are aligned to have the same phase, both ends of the one-period portion of the internal outrun waveform may be set to be the same as both ends, respectively, of the one-period portion of the external outrun waveform, and only portions of the overlapping waves each of which has a relatively greater positive amplitude or the same positive amplitude may be connected, generating the synthesis waveform.

According to yet another aspect of the present invention, there is provided a method of marking a minimum-value position of runout of a wheel, the method including: measuring each of an internal runout and an external runout of the wheel; extracting a primary component of a waveform of the measured internal runout and a primary component of a waveform of the measured external runout and setting the former and latter measured primary components to be an internal runout waveform and an external runout waveform, respectively; forming a synthesis waveform by causing the internal runout waveform and the external runout waveform of the wheel to overlap and connecting only profile portions each of which has a relatively higher value or the same value; and marking a minimum-value position on the synthesis waveform, as a minimum-value position of runout of the wheel.

In the method, the synthesis waveform may be formed by causing a one-period portion of the internal runout waveform and a one-period portion of the external runout waveform to overlap in a state where both ends of the one-period portion of the internal outrun wave are set to be the same as both ends, respectively, of the one-period portion of the external outrun wave.

According to yet another aspect of the present invention, there is provided an apparatus of marking a minimum-value position of runout of a wheel, the apparatus including: a measurement unit that measures each of the internal runout and external runout of a wheel; a waveform extraction unit that extracts a primary component of a waveform of the measured internal runout and a primary component of a waveform of the measured external runout and setting the former and latter measured primary components to be an internal runout waveform and an external runout waveform, respectively; a waveform synthesis unit that forms a synthesis waveform by causing the internal runout waveform and the external runout waveform of the wheel and connecting only profile portions each of which has a relatively higher value or the same value; and a marking unit that marks a minimum-value position on the synthesis waveform, as a minimum-value position of runout of the wheel.

In the apparatus, the waveform extraction unit may be configured to set a primary component, which is acquired by performing Fourier transform on a waveform of the measured internal runout, to be the internal runout waveform, and to set a primary component, which is acquired by performing Fourier transform on a waveform of the measured external runout, to be the external runout waveform.

In the apparatus, the waveform synthesis unit may be configured to form the synthesis waveform by causing a one-period portion of the internal outrun wave and a one-period portion of the external outrun waveform to overlap in a state where both ends of the one-period portion of the internal outrun waveform are set to be the same as both ends, respectively, of the one-period portion of the external runout waveform.

According to various exemplary embodiments of the present invention, a more appropriate balance between a tire and a wheel is provided, and thus vibration of a vehicle body, slight shaking of a steering wheel, or the like is reduced while a vehicle travels. This provides the advantage that vehicle-riding comfort may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

Figure 1:
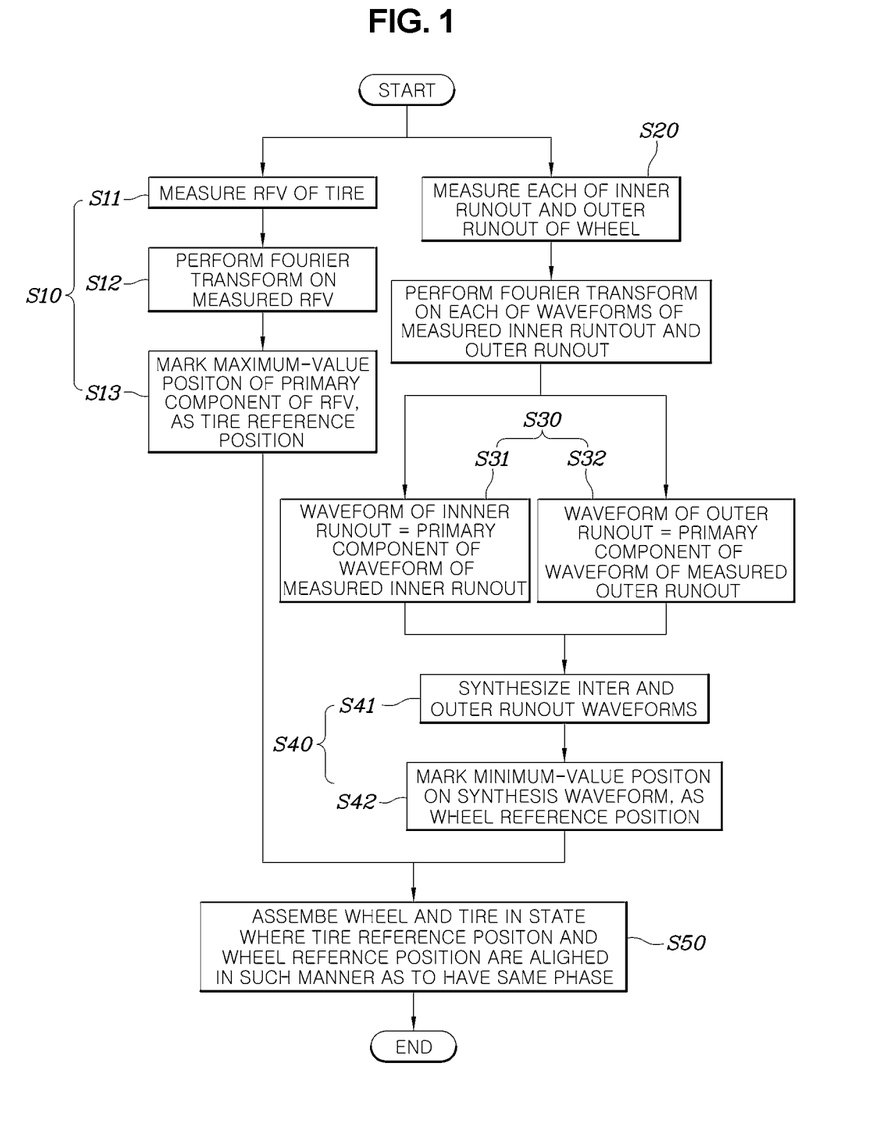
FIG. 1 is a flowchart illustrating a method of balancing an assembly of a wheel and a tire according to various exemplary embodiments of the present invention.
Figure 2:
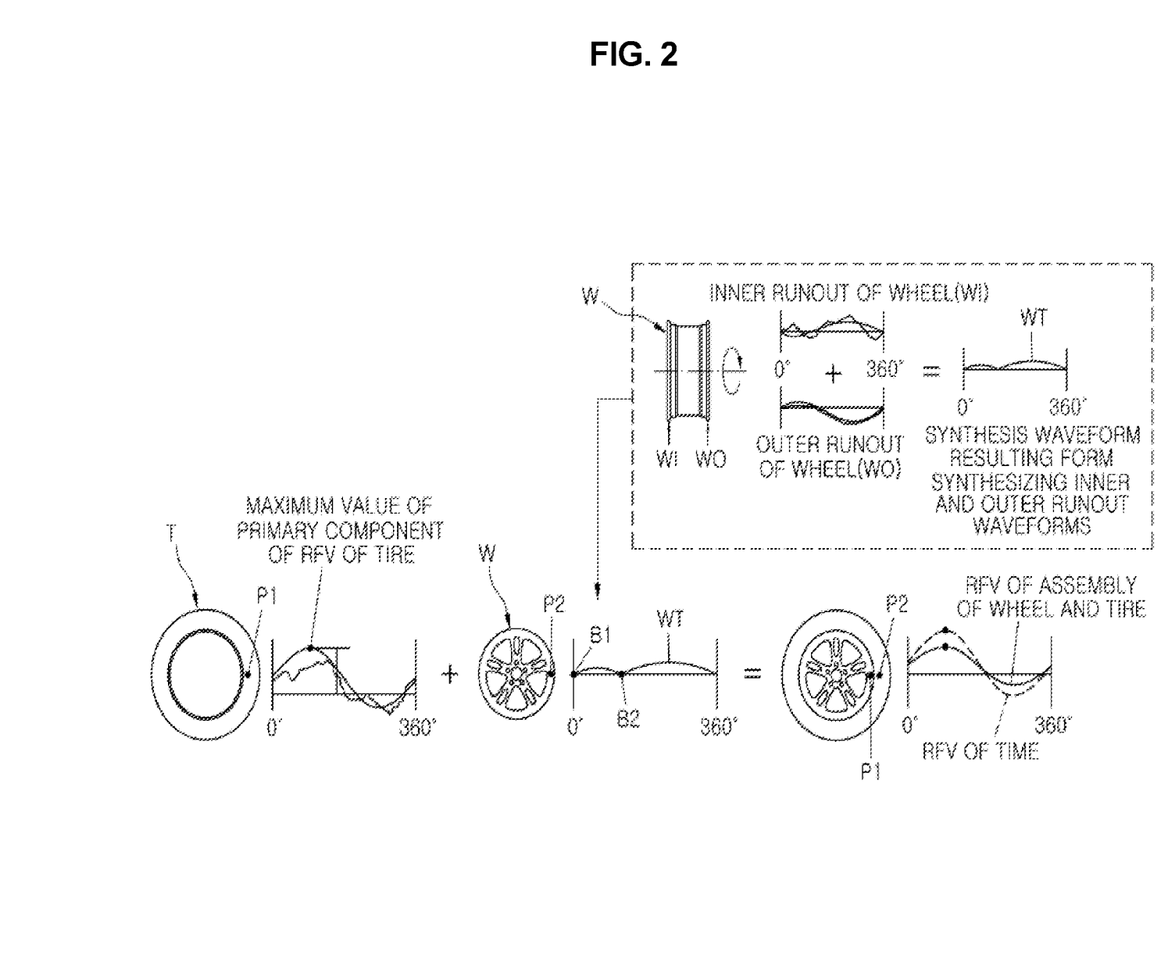
FIG. 2 is a diagram illustrating the method of balancing an assembly of a wheel and a tire according to various exemplary embodiments of the present invention.

With reference to FIG. 1 and FIG. 2, a method of balancing an assembly of a wheel and a tire according to various exemplary embodiments of the present invention includes a step S10 of measuring a maximum-value position of radial force variation (RFV) of a tire T and marking the measured maximum-value position, as a tire reference position P1, on the tire T; a step S20 of measuring each of an internal runout and an external runout of the wheel W; a step S30 of extracting a primary component of a waveform of the measured internal runout and a primary component of a waveform of the measured external runout and setting the former and latter measured primary components to be an internal runout waveform and an external runout waveform, respectively; a step S40 of synthesizing the internal runout waveform and the external runout waveform and marking a minimum-value position on a synthesis waveform resulting from the synthesizing, as a wheel reference position P2, on the wheel W; and a step S50 of aligning the tire reference position P1 on the tire T and the wheel reference position P2 on the wheel W to have the same phase and assembling the wheel W and the tire T.

That is, according to various exemplary embodiments of the present invention, the maximum-value position of the RFV of the tire T is measured, and the measured position thereof is marked as the tire reference position P1. Furthermore, the minimum-value position, which is acquired from the synthesis waveform resulting from synthesizing the internal runout waveform and the external runout waveform of the wheel W, is marked as the wheel reference position (P2). Accordingly, the wheel W and the tire T are assembled in a state where the tire reference position P1 and the wheel reference position P2 are aligned to have the same phase. Thus, an amplitude of the RFV of the assembly of the wheel and the tire is remarkably decreased.

Of course, as described above, in a state where the amplitude of the RFV of the assembly of the wheel and the tire is decreased, when the assembly of the wheel and the tire is mounted on a vehicle, vibration of a vehicle body or slight shaking of a steering wheel W due to dynamic imbalance of the assembly of the wheel and the tire is reduced or prevented while the vehicle travels, greatly improving vehicle-riding comfort.

For reference, according to various exemplary embodiments of the present invention, the runout of the wheel means runout in a radial direction of the wheel, that is, in a radial direction thereof.

The maximum-value position of the RFV of the tire T is set as a maximum-value position of a primary component of the RFV.

That is, while the tire T that is an assembly target is rotated in a measurement apparatus, the RFV is measured. Fourier transform is performed on a waveform of the measured RFV, and thus a maximum-value position of a primary component is acquired. The acquired position is the tire reference position P1.

Of course, a maximum-value position on the waveform itself of the measured RFV may be set as the tire reference position P1 without performing Fourier transform on the waveform of the RFV measured in the measurement apparatus. However, in the instant case, it is difficult to rule out the possibility that a substantial maximum-value position of the RFV will be erroneously selected due to noise. According to various exemplary embodiments of the present invention, as described above, the maximum-value position of the primary component is selected by performing Fourier transform. Thus, the substantial maximum-value position of the RFV of the tire T may be correctly selected without a significant error.

On the other hand, as described above, each of the internal runout and external runout of the wheel W is measured and the respective primary components of the waveforms of the measured internal runout and external runout are also extracted by performing Fourier transform on the waveforms thereof. Thus, the primary component of the waveform of the measured internal runout is set to be the internal runout waveform, and the primary component of the waveform of the measured external runout is set to be the external runout waveform.

For synthesis of the internal runout waveform and the external runout waveform of the wheel W, the internal runout waveform and the external runout waveform are caused to overlap. Accordingly, only profile portions each of which has a relatively higher value or the same value are connected, forming the synthesis waveform.

That is, a one-period portion of the internal runout waveform and a one-period portion of the external runout waveform, which have a same phase, are caused to overlap in a state where both ends of the one-period portion of the internal runout waveform are a same as both ends of the one-period portion of the external runout wave, respectively form. Accordingly, in these overlapping waveforms, only profile portions each of which has a relatively greater amplitude or the same amplitude are connected, forming the synthesis waveform.

Figure 3A:
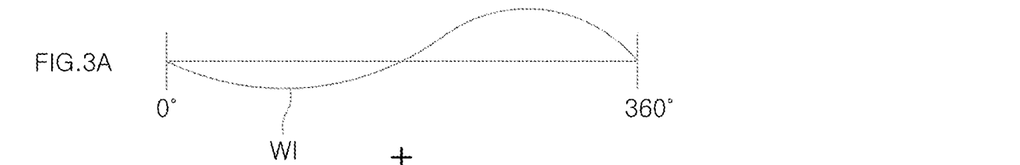
FIG. 3A, FIG. 3B, FIG. 3C and FIG. 3D are graphs illustrating that a synthesis waveform is formed using an internal runout waveform of a wheel and an external runout waveform of the wheel according to various exemplary embodiments of the present invention.
Figure 3B:
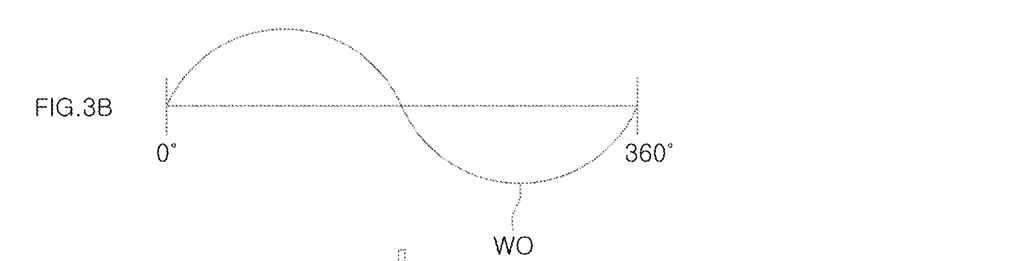
Figure 3C:
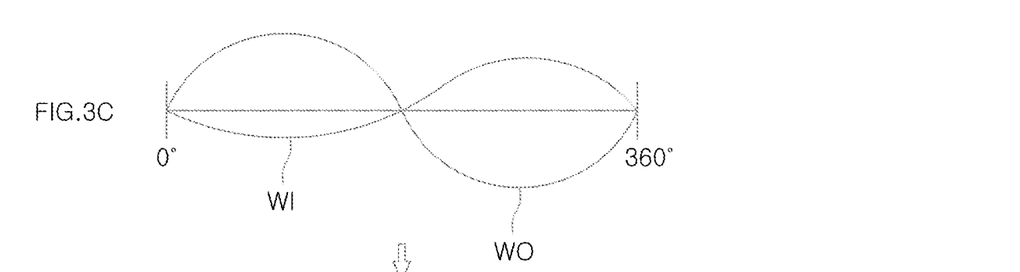
Figure 3D:
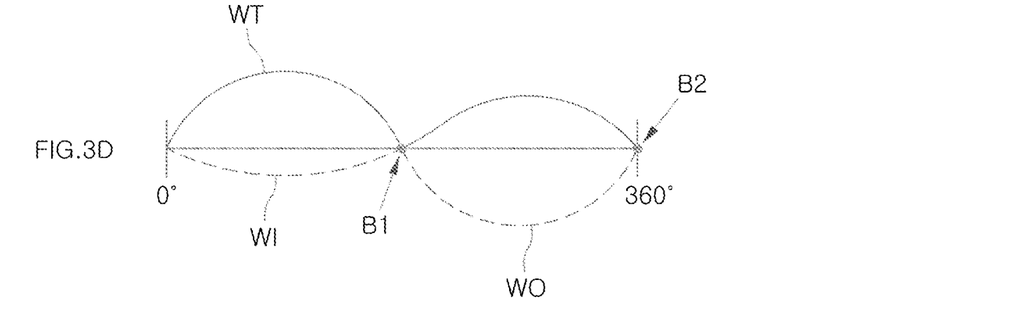

For example, with reference to FIGS. 3A and 3B, when a one-period portion of an internal runout waveform WI and a one-period portion of an external runout waveform WO are caused to overlap in a state where both ends of a portion in a range of 0° to 360°, that is, the one-period portion, of the internal runout waveform WI of the wheel are set to be the same as both ends, respectively, of a portion in a range of 0° to 360°, that is, the one-period portion, of the external runout waveform WO of the wheel, the two waveforms WI and WO overlap, as illustrated in FIG. 3C. In this state, profile portions each of which has a relatively greater positive amplitude or the same positive amplitude are connected, forming a synthesis waveform WT, as illustrated in FIG. 3D.

At this point, B1 and B2 are minimum-value positions on the synthesis waveform, and ultimately becomes final positions of a minimum point of the runout of the wheel, which are decided according to various exemplary embodiments of the present invention. Any one of these two positions, when marked on the wheel, becomes a position P2 of a minimum point in the wheel.

With reference to FIG. 4, FIG. 5, FIG. 6, and FIG. 7, a method of deciding a minimum-value position of runout of the wheel W and marking the minimum-value position is described.

Figure 4:
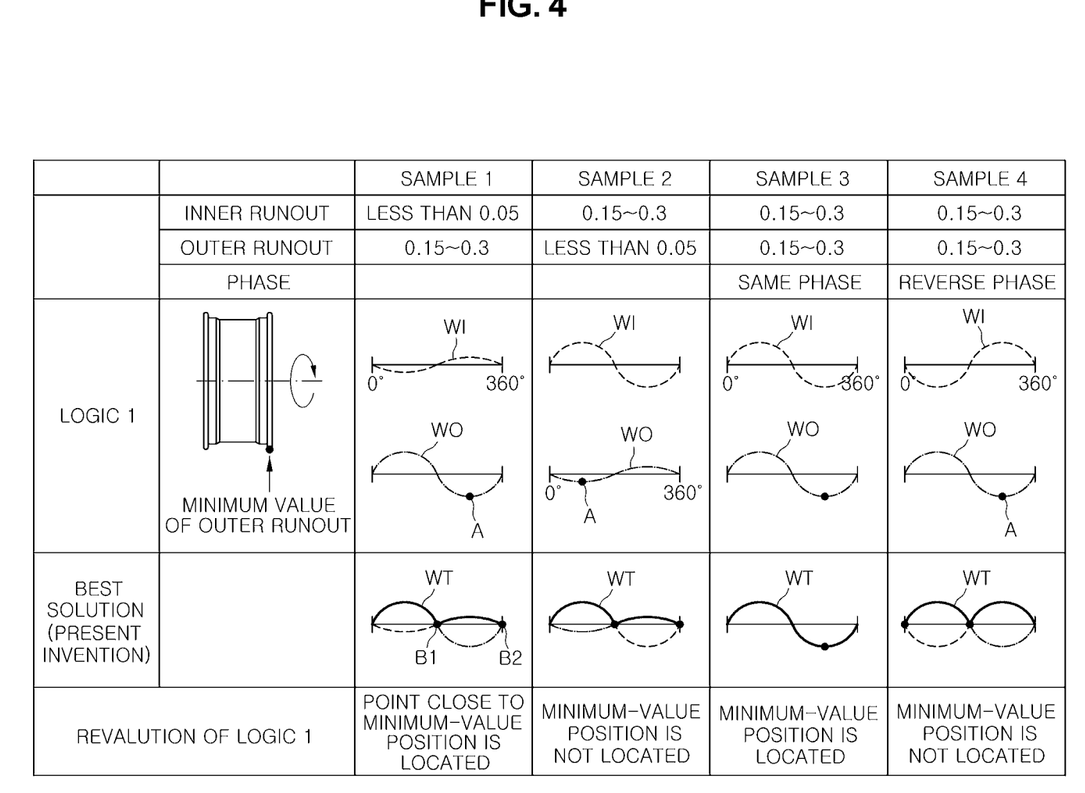
FIG. 4 is a diagram illustrating a method of deciding a minimum-value position of runout of a wheel using only the external runout waveform of the wheel.

FIG. 4 is a diagram illustrating Logic 1 that is the method of deciding the minimum-value position of the runout of the wheel W using only the external runout waveform of the wheel W. Four cases that result from combining the internal runout of the wheel W and the external runout of the wheel W are categorized into Samples 1 to 4, respectively. A method of selecting a final minimum-value position of runout in each of Samples 1 to 4 is described.

Sample 1 is a state where an amplitude of the internal runout of the wheel W is less than 0.05 and thus runout seldom occur in the internal side of the wheel and where an amplitude of the external runout of the wheel W is 0.15 to 0.3 and thus runout occurs to a comparatively great extent in the external side of the wheel.

In Logic 1, the minimum-value position of the runout of the wheel is decided using only the external runout waveform WO of the wheel. Therefore, a position that is marked as A which represents a minimum-value position on the external runout waveform (WO) of the wheel is decided as a final minimum-value position of the runout of the wheel W. However, substantially at a position that is represented by Point A on the internal runout waveform (WI) of the wheel, runout occurs to the greatest extent. Because of this, point A is not suitable for representing the minimum-value position of the runout of the wheel W.

In contrast, as will be described below for comparison, the minimum-value positions of the runout of the wheel, which are obtained from the synthesis waveform WT according to various exemplary embodiments of the present invention are decided as B1 and B2. Considering that, as described above, at Point A, the external runout of the wheel is minimized and the internal runout of the wheel is maximized, it may be understood that, instead of A, B1 and B2 are more suitable for representing the minimum-value position of the runout of the wheel.

Figure 5:
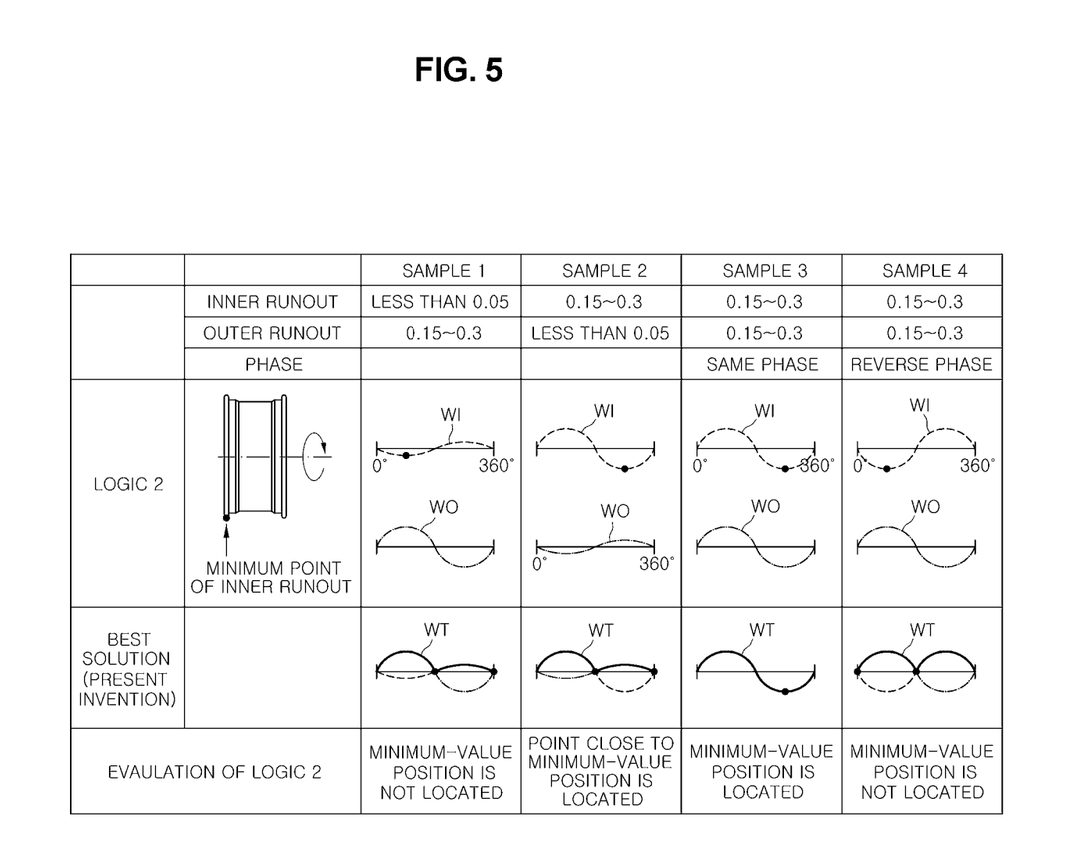
FIG. 5 is a diagram illustrating the method of deciding a minimum-value position of runout of a wheel using only the internal runout waveform of the wheel.
Figure 6:
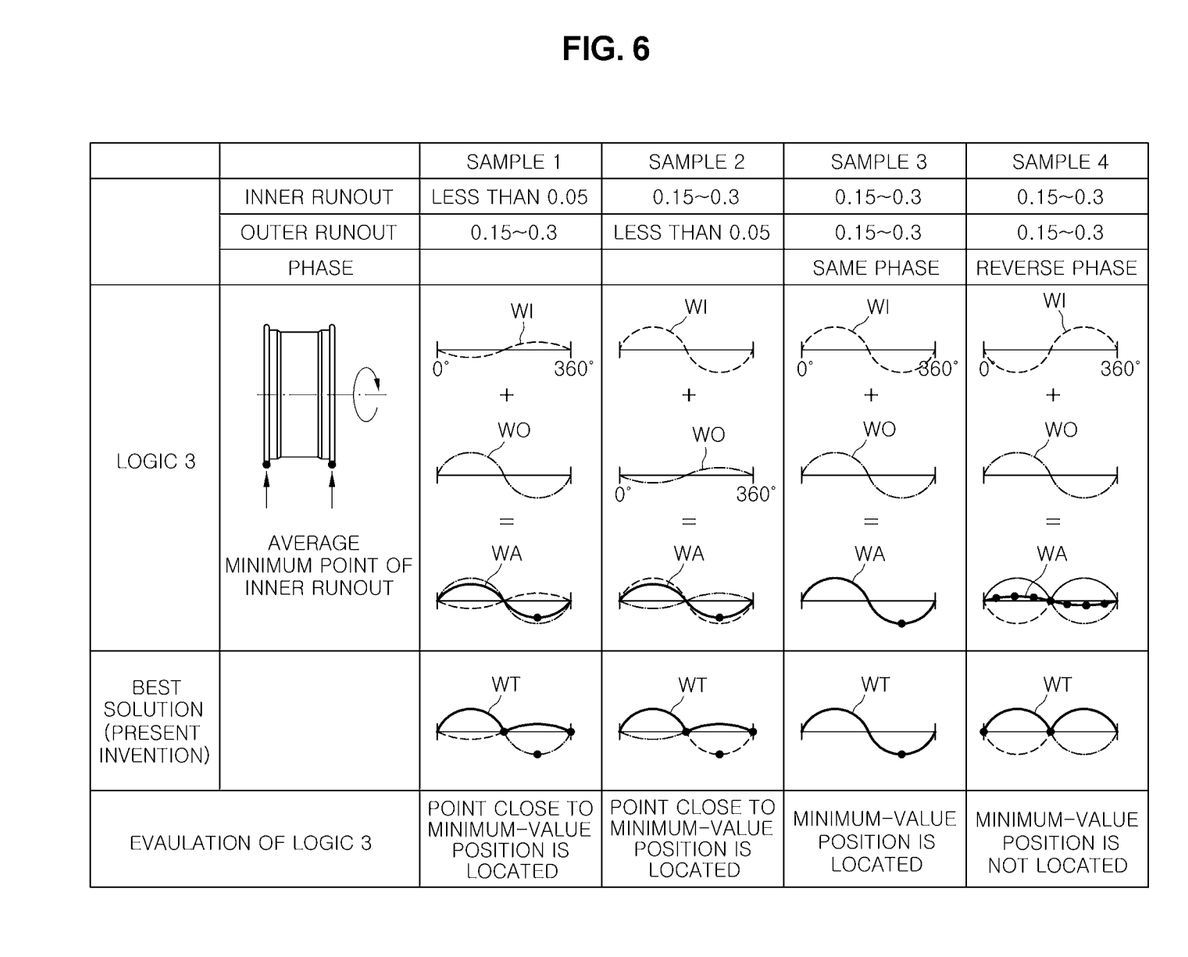
FIG. 6 is a diagram illustrating the method of deciding a minimum-value position of runout of a wheel using an average of the internal and external runout waveforms of the wheel.

For reference, in FIG. 4, FIG. 5 and FIG. 6, the minimum-value position of the runout of the wheel, which is obtained from the synthesis waveform according to various exemplary embodiments of the present invention, is expressed as a "best solution".

As described above, in a case where Logic 1 applies to Sample 1, A is positioned between B1 and B2 and thus a position that is comparatively adjacent to B1 or B2 is selected as a minimum point of the runout of the wheel. Therefore, the result of evaluation is that a point close to a substantial minimum-value position is located.

In Sample 2, the amplitude of the internal runout of the wheel W is in a comparatively great range of 0.15 to 0.3, and the external runout of the wheel W is a maximum of less than 0.05. This is the opposite of the situation in Sample 1.

In a case where Logic 1 applies to Sample 2, the runout is not even reflected for an internal side of the wheel W where the runout changes substantially to a great extent, and a minimum-value position A on the external runout waveform WO of the wheel is selected as the minimum-value position of the runout of the wheel. Therefore, as illustrated, the result of evaluation is that a suitable minimum-value position of the runout of the wheel is not located.

In Sample 3, the respective amplitudes of the internal runout and external runout of the wheel W are in a comparatively great range of 0.15 to 0.3 in a state where the internal and external runout waveforms are in the same phase. When Logic 1 applies to Sample 3, a minimum-value position on the external runout waveform WO of the wheel is the same as a minimum-value position on the internal runout waveform WI of the wheel. Therefore, as illustrated, the result of evaluation is that the minimum-value position is correctly located.

In Sample 4, the respective amplitudes of the internal runout and external runout of wheel W are in a comparatively great range of 0.15 to 0.3 in a state where the internal and external runout waveforms are in opposite phases. The minimum-value position on the internal runout waveform WI of the wheel is positioned to the left, but A that is a minimum-value position on the external runout waveform WO of the wheel is positioned to the right. Therefore, A that is a minimum-value position on the external runout waveform WO of the wheel is unsuitable as a minimum-value position of the runout that represents the entire wheel. The result of evaluation is that in Sample 4, the minimum-value position on the wheel is not located by applying Logic 1.

As opposed to FIG. 4, FIG. 5 illustrates Logic 2 that is a method of deciding the minimum-value position of the runout of the wheel W using only the internal runout waveform WI of the wheel.

As illustrated, in a case where Logic 2 applies to Sample 2, the result of evaluation is that a point close to the minimum-value position is located. In a case where Logic 2 applies to Sample 3, the result of evaluation is that the minimum-value position is located. However, in a case where Logic 2 applies to Samples 1 and 4, the result of evaluation is that a representative minimum-value position on the wheel W is not located.

FIG. 6 illustrates Logic 3 that is a method of deciding the minimum-value position of the runout of the wheel W using an average waveform WA that is an average of the internal runout waveform WI of the wheel and the external runout waveform WO of the wheel.

Unlike in Logic 1 or 2, in Logic 3, the minimum-value position of the runout of the wheel is located considering both the internal runout waveform WI of the wheel and the external runout waveform WO of the wheel. As illustrated, a minimum-value position on the average waveform WA that is formed by connecting respective averages of amplitudes of the internal runout waveform WI and amplitudes of the external runout waveform WO is decided as the minimum-value position of the runout of the wheel.

In a case where Logic 3 applies Samples 1 to 4, as illustrated, in Samples 1, 2, and 3, the minimum-value position of the runout of the wheel W or a position close to the minimum-value position thereof is located. However, in Sample 4, runout waveforms in the same form are disposed in opposite phrases. Therefore, the average waveform WA is formed almost in a horizontal line. Thus, the minimum-value position of the runout of the wheel cannot be specified.

Figure 7:
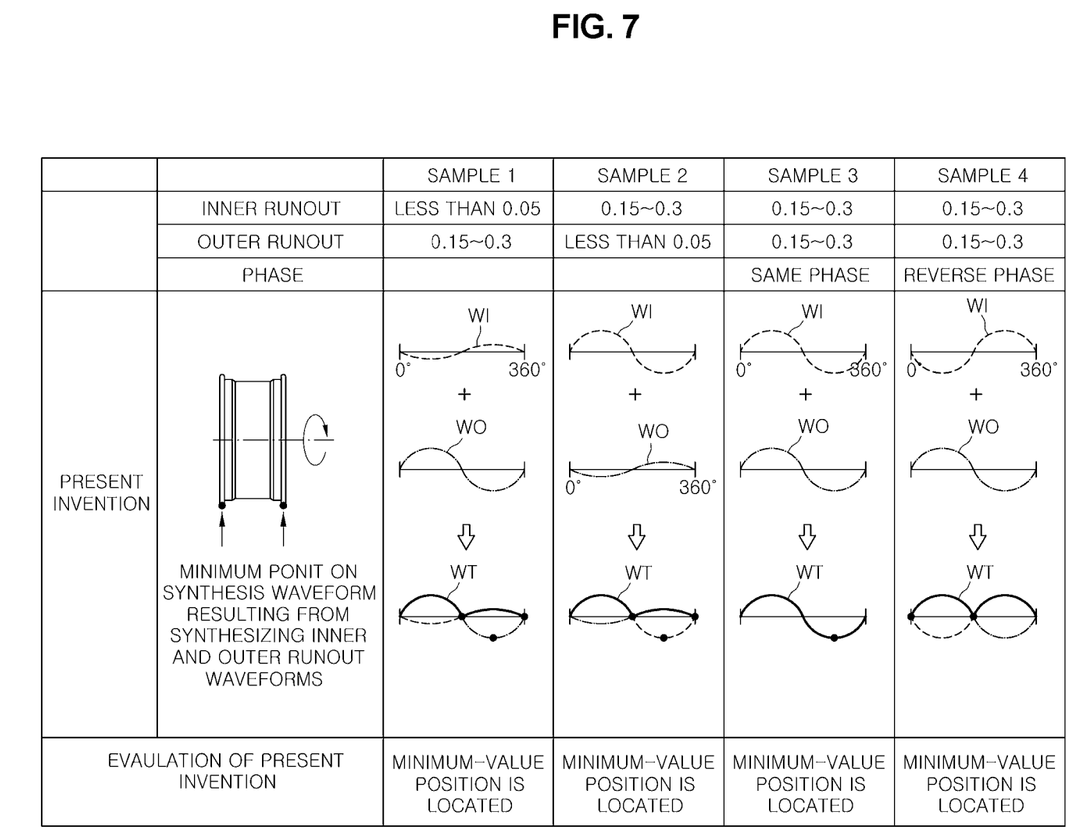
FIG. 7 is a diagram illustrating the method of deciding a minimum-value position of runout of a wheel using the synthesis waveform that results from synthesizing the internal and external runout waveforms of the wheel according to various exemplary embodiments of the present invention.

FIG. 7 illustrates a summary of how the minimum-value position of the runout of the wheel W is selected in Samples 1 to 4 according to various exemplary embodiments of the present invention. From FIG. 7, it may be seen that in each of Samples 1 to 4, a representative minimum-value position of the runout of the wheel W is located.

For reference, according to various exemplary embodiments of the present invention, in a case where the minimum-value position of the runout of the wheel is located, in each of Samples 1, 2, and 4 other than in Sample 3, two minimum-value positions of the runout of the wheel are selected, and in practice, only one of these is marked on the wheel.

Of course, the RFV of the assembly of the wheel and the tire may be minimized as described above. That is, a substantially representative minimum-value position of the runout of the wheel W is located, and then this position is marked, as the wheel reference position (P2), with a spot or the like. Accordingly, the wheel and the tire are assembled in a state where the tire reference position P1 of the tire T and the wheel reference position P2 of the wheel W are aligned to have a same phase.

There is provided a method of balancing an assembly of a wheel and a tire according to various exemplary embodiments of the present invention.

That is, with reference to FIG. 1, the method according to various exemplary embodiments of the present invention includes a step S20 of measuring each of an internal runout and an external runout of the wheel; a step S31 of extracting an internal runout waveform, plotted as a continuous function, from data resulting from measuring the internal runout of the wheel; a step S32 of extracting an external runout waveform, plotted as a continuous function, from data resulting from measuring the external runout of the wheel; a step S41 of synthesizing the internal runout waveform and the external runout waveform and thus generating a synthesis waveform; a step S42 of marking a minimum-value position on the synthesis waveform, as a wheel reference position, on the wheel; a step S11 of measuring RFV of a tire; a step S12 of extracting a waveform of a tire, plotted as a continuous function, from data resulting from measuring the RFV of the tire; a step S13 of marking a maximum-value position on the waveform of the tire, as a tire reference position, on the tire; and a step S50 of assembling the wheel and the tire in a state where the wheel reference position on the wheel and the tire reference position on the tire are aligned to have a same phase.

In the step S31 of extracting the internal runout wave from the data resulting from measuring the internal runout of the wheel, Fourier transform is performed on the data resulting from the internal runout of the wheel, a primary component of the Fourier-transformed data is extracted, and the extracted primary component is set to be the internal runout wave WI.

In addition, in the step S32 of extracting the external runout waveform from the data from measuring the external runout of the wheel, Fourier transform is performed on the data resulting from the external runout of the wheel, a primary component of the Fourier-transformed data is extracted, and the extracted primary component is set to be the external runout wave WO.

In the step S41 of generating the synthesis waveform WT, in a state where a one-period portion of the internal runout waveform WI and a one-period portion of the external runout waveform WO are aligned to have the same phase, both ends of the one-period portion of the internal runout waveform WI are set to be a same as both ends of the one-period portion of the external runout wave, respectively form WO. Accordingly, only portions of the overlapping waveforms, each of which has a relatively greater positive amplitude or the same positive amplitude, are connected, forming the synthesis waveform WT.

Figure 8:
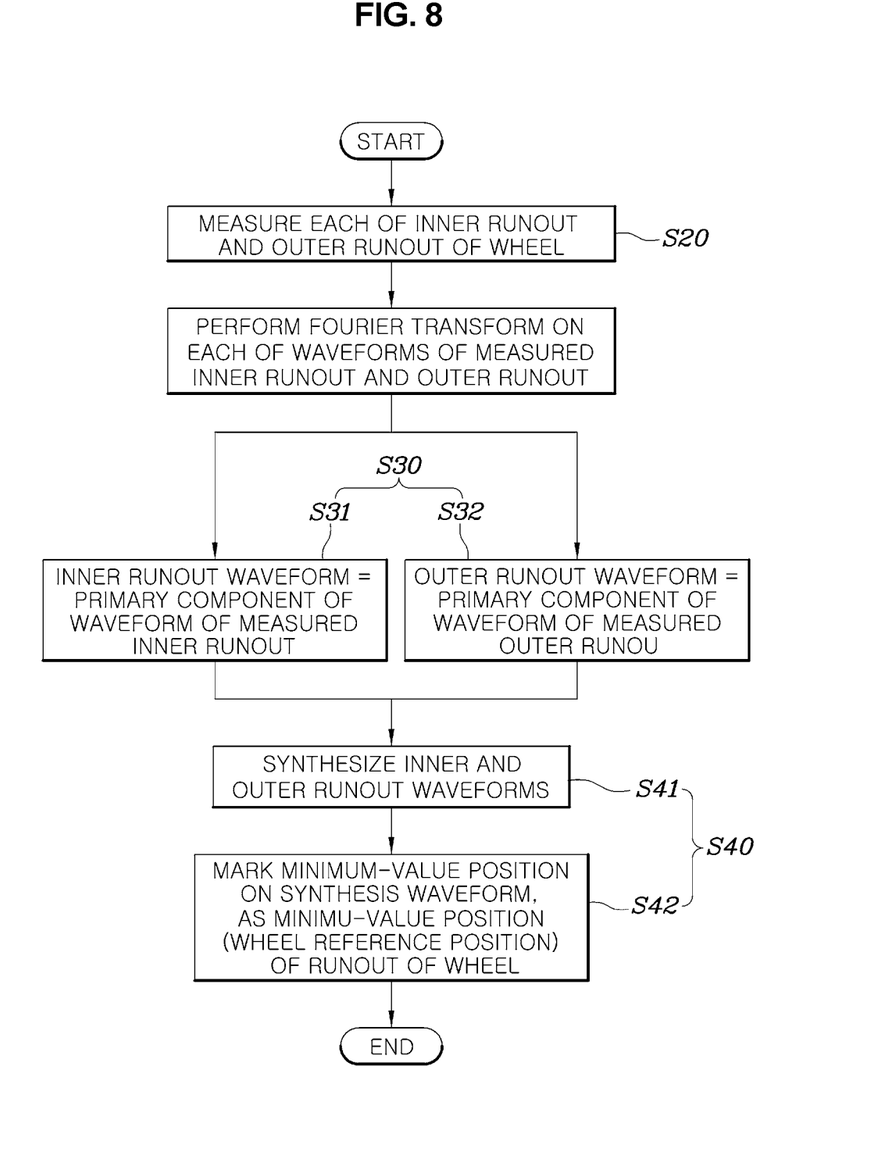
FIG. 8 is a flowchart illustrating a method of marking a minimum-value position of runout of a wheel according to various exemplary embodiments of the present invention.

On the other hand, only a method of marking a minimum-value position of runout of a wheel is described separately as follows. As illustrated in FIG. 8, the method includes a step S20 of measuring each of an internal runout and an external runout of the wheel W; a step S30 of extracting a primary component of a waveform of the measured internal runout and a primary component of a waveform of the measured external runout and setting the former and latter measured primary components to be an internal runout waveform and an external runout waveform, respectively; a step S41 of causing the internal runout waveform and the external runout waveform of the wheel W to overlap and thus forming a synthesis waveform by connecting only profile portions each of which has a relatively higher value or the same value; and a step S42 of marking a minimum-value position on the synthesis waveform, as a minimum-value position of runout of the wheel W.

That is, the minimum-value position of the runout of the wheel is the same as the wheel reference position.

Of course, the synthesis waveform is formed by causing one-period portion of the internal runout waveform and one-period portion of the external runout waveform, which have a same phase, to overlap in a state where both ends of the one-period portion of the internal runout waveform are set to be the same as both ends, respectively of the one-period portion of the external runout waveform.

Figure 9:
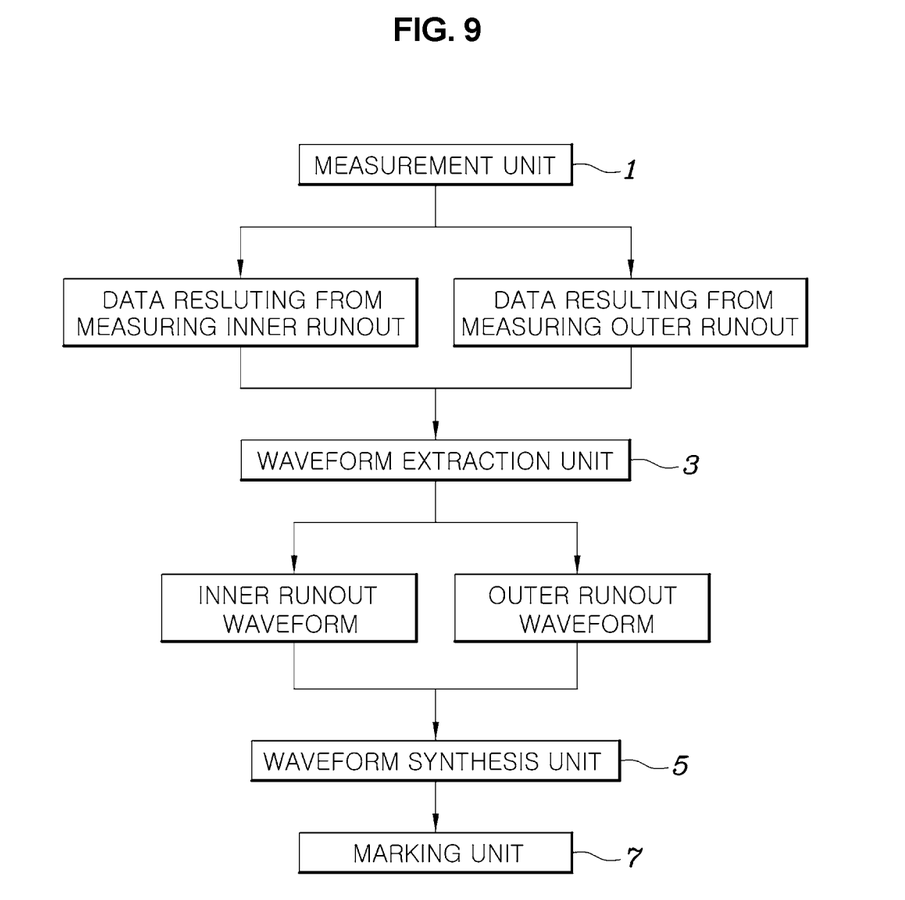
FIG. 9 is a diagram illustrating a configuration of an apparatus of marking a minimum-value position of runout of a wheel according to various exemplary embodiments of the present invention.

FIG. 9 is a diagram illustrating a configuration of an apparatus of marking a minimum-value position of runout of a wheel according to various exemplary embodiments of the present invention. The apparatus includes a measurement unit 1 that measures each of the internal runout and external runout of a wheel; a waveform extraction unit 3 that extracts a primary component of a waveform of the measured internal runout and a primary component of a waveform of the measured external runout and sets the former and latter measured primary components to be an internal runout waveform and an external runout waveform, respectively; a waveform synthesis unit 5 that causes the internal runout waveform and the external runout waveform of the wheel to overlap and thus forms a synthesis waveform by connecting only profile portions each of which has a relatively higher value or the same value; and a marking unit 7 that marks a minimum-value position on the synthesis waveform, as a minimum-value position of runout of the wheel.

Of course, the measurement apparatus that measures the RFV of the tire may be separately provided. It is also possible that the marking apparatus additionally is configured for measuring the RFV of the tire.

The waveform extraction unit 3 is configured to set the primary component, which is acquired by performing Fourier transform on the waveform of the measured internal runout, to be the internal runout waveform, and to set the primary component, which is acquired by performing Fourier transform on the waveform of the measured external runout, to be the external runout waveform.

The waveform synthesis unit 5 is configured to cause a period portion of the internal runout waveform and a one-period portion of the external runout waveform, which has the same phase, to overlap in a state where both ends of the one-period portion of the internal runout waveform are set to be a same as both ends of the one-period portion of the external runout wave, respectively form and thus to generate the synthesis waveform.

In various exemplary embodiments of the present invention, a controller may perform the methods of the present invention such as FIGS. 1 and 8 and the controller may include the measurement unit 1, the waveform extraction unit 3, the waveform synthesis unit 5 and the marking unit 7 disclosed in FIG. 9.

In addition, the term "controller" or "control unit" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller or the control unit may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of balancing an assembly of a wheel and a tire, the method comprising:
   measuring a maximum-value position of radial force variation (RFV) of the tire and marking the measured maximum-value position, as a tire reference position, on the tire;
   measuring each of an internal runout and an external runout of the wheel;
   extracting a primary component of a waveform of the measured internal runout and a primary component of a waveform of the measured external runout and setting the primary component of the waveform of the measured internal runout and the primary component of the waveform of the measured external runout to be an internal runout waveform and an external runout waveform, respectively;
   synthesizing the internal runout waveform and the external runout waveform and marking a minimum-value position on a synthesis waveform resulting from the synthesizing, as a wheel reference position, on the wheel; and
   aligning the tire reference position on the tire and the wheel reference position on the wheel to have a same phase and assembling the wheel and the tires
   wherein, in synthesizing the internal runout waveform and the external runout waveform of the wheel, the internal runout waveform and the external runout waveform are caused to overlap, and only profile portions each of which has a value higher than or a same as a predetermined value are connected, forming the synthesis waveform.

2. The method according to claim 1, wherein the maximum-value position of the RFV of the tire is set as a maximum-value position of a primary component of the RFV.

3. The method according to claim 1, wherein, in causing the internal runout waveform and the external runout waveform to overlap, a one-period portion of the internal runout waveform and a one-period portion of the external runout waveform, which have a same phase, are caused to overlap in a state where both ends of the one-period portion of the internal runout wave are set to be a same as both ends of the one-period portion of the external runout wave, respectively.

4. A method of balancing an assembly of a wheel and a tire, the method comprising:
   measuring each of an internal runout and an external runout of the wheel;
   extracting an internal runout waveform, expressed as a continuous function, from data resulting from measuring the internal runout of the wheel;
   extracting an external runout waveform, expressed as a continuous function, from data resulting from measuring the external runout of the wheel;
   synthesizing the internal runout waveform and the external runout waveform and thus generating a synthesis waveform;
   marking a minimum-value position on the synthesis waveform, as a wheel reference position, on the wheel;
   measuring radial force variation (RFV) of the tire;
   extracting a waveform of the tire, plotted as a continuous function, from data resulting from measuring the RFV of the tire;
   marking a maximum-value position on the waveform of the tire, as a tire reference position, on the tire; and
   assembling the wheel and the tire in a state where the wheel reference position on the wheel and the tire reference position on the tire are aligned to have a same phase.

5. The method according to claim 4, wherein, in the extracting of the internal runout waveform from the data resulting from measuring the internal runout of the wheel, Fourier transform is performed on the data resulting from measuring the internal runout of the wheel, a primary component of the Fourier-transformed data is extracted, and the extracted primary component is set to be the internal runout wave.

6. The method according to claim 4, wherein, in the extracting of the external runout waveform from the data resulting from measuring the external runout of the wheel, Fourier transform is performed on the data resulting from measuring the external runout of the wheel, a primary component of the Fourier-transformed data is extracted, and the extracted primary component is set to be the external runout wave.

7. The method according to claim 4, wherein, in the synthesizing of the internal runout waveform and the external runout waveform and thus in the generating of the synthesis waveform, in a state where a one-period portion of the internal outrun waveform and a one-period portion of the external outrun waveform are aligned to have a same phase, both ends of the one-period portion of the internal outrun waveform are set to be a same as both ends of the one-period portion of the external outrun waveform, respectively, and only portions of overlapping waves each of which has a positive amplitude greater than and a same as a predetermined positive amplitude are connected, generating the synthesis waveform.

8. A method of marking a minimum-value position of runout of a wheel, the method comprising:
   measuring each of an internal runout and an external runout of the wheel;
   extracting a primary component of a waveform of the measured internal runout and a primary component of a waveform of the measured external runout and setting the primary component of the waveform of the measured internal runout and the primary component of the waveform of the measured external runout to be an internal runout waveform and an external runout waveform, respectively;

forming a synthesis waveform by causing the internal runout waveform and the external runout waveform of the wheel to overlap and connecting only profile portions each of which has a value higher than or a same as a predetermined value; and marking a minimum-value position on the synthesis waveform, as the minimum-value position of the runout of the wheel.

9. The method according to claim 8, wherein the synthesis waveform is formed by causing a one-period portion of the internal runout waveform and a one-period portion of the external runout waveform to overlap in a state where both ends of the one-period portion of the internal outrun wave are set to be a same as both ends of the one-period portion of the external outrun wave, respectively.

* * * * *